(12) United States Patent
Ishiguro et al.

(10) Patent No.: US 9,115,589 B2
(45) Date of Patent: Aug. 25, 2015

(54) IMPELLER AND METHOD FOR PRODUCING SAME

(75) Inventors: Motohisa Ishiguro, Anjo (JP); Tomoyasu Hirano, Yatomi (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 443 days.

(21) Appl. No.: 13/700,928

(22) PCT Filed: Jun. 6, 2011

(86) PCT No.: PCT/JP2011/062906
§ 371 (c)(1),
(2), (4) Date: Nov. 29, 2012

(87) PCT Pub. No.: WO2012/002107
PCT Pub. Date: Jan. 5, 2012

(65) Prior Publication Data
US 2013/0071247 A1    Mar. 21, 2013

(30) Foreign Application Priority Data

Jun. 30, 2010    (JP) .................................. 2010 149413

(51) Int. Cl.
*F04D 29/30* (2006.01)
*F01D 5/14* (2006.01)
(Continued)

(52) U.S. Cl.
CPC ................ *F01D 5/141* (2013.01); *B29C 53/02* (2013.01); *B29C 67/0048* (2013.01);
(Continued)

(58) Field of Classification Search
CPC ........... F04D 1/00; F04D 29/00; F04D 29/18; F04D 29/24; F04D 29/22; F04D 29/242; F04D 29/2222; F04D 29/2216
USPC ....................................................... 416/223 B
See application file for complete search history.

(56) References Cited

U.S. PATENT DOCUMENTS

| | | | |
|---|---|---|---|
| 4,520,541 | A | 6/1985 | Miki et al. |
| 4,708,593 | A * | 11/1987 | Banyay .......................... 416/183 |
| 2010/0322762 | A1 | 12/2010 | Shirahama et al. |

FOREIGN PATENT DOCUMENTS

| | | |
|---|---|---|
| JP | 58-119998 A | 7/1983 |
| JP | 58-128243 A | 7/1983 |

(Continued)

OTHER PUBLICATIONS

Extended European Search Report dated Mar. 12, 2015, issued by the European Patent Office in the corresponding European Application No. 11800575.0. (5 pages).

(Continued)

*Primary Examiner* — Richard Edgar
(74) *Attorney, Agent, or Firm* — Buchanan Ingersoll & Rooney PC

(57) ABSTRACT

An impeller integrally includes a substrate and multiple impeller blades provided upright along a curved shape and circumferentially spaced apart on one face of the substrate. The impeller blades expand in diameter and each include an inner circumferential-side blade portion on the inner circumferential side of the substrate and extending in the rotary shaft core direction and have a tip side that is bent, and an outer circumferential-side blade portion on the outer circumferential side of the substrate and extending in the rotary shaft core direction. In the direction along the rotary shaft core, the length of the inner circumferential-side blade portion from the substrate side to the tip side is longer than the length of the outer circumferential-side blade portion from the substrate side to the tip side, and the blade thickness of the inner circumferential-side blade portion gradually decreases from the substrate side toward the tip side.

5 Claims, 4 Drawing Sheets

(51) Int. Cl.
  *F04D 29/28* (2006.01)
  *B29C 67/00* (2006.01)
  *B29C 53/02* (2006.01)
  *F04D 29/22* (2006.01)
  *F04D 29/24* (2006.01)
  *B29L 31/00* (2006.01)
  *B29L 31/08* (2006.01)

(52) U.S. Cl.
  CPC ......... *F04D 29/2222* (2013.01); *F04D 29/242* (2013.01); *F04D 29/281* (2013.01); *F04D 29/282* (2013.01); *F04D 29/284* (2013.01); *F04D 29/30* (2013.01); *B29L 2031/08* (2013.01); *B29L 2031/7498* (2013.01)

(56) References Cited

FOREIGN PATENT DOCUMENTS

| | | | |
|---|---|---|---|
| JP | 59-120338 | A | 7/1984 |
| JP | 8-193598 | A | 7/1996 |
| JP | 2666490 | B2 | 10/1997 |
| JP | 2006-002689 | A | 1/2006 |
| JP | 2008-169826 | A | 7/2008 |

OTHER PUBLICATIONS

Notification of Transmittal of Translation of the International Preliminary Report on Patentability (Forms PCT/IB/338 and PCT/IB/373) and the Written Opinion of the International Searching Authority (Form PCT/ISA/237) issue on Feb. 21, 2013, in the corresponding International Application No. PCT/JP2011/062906. (7 pages).
International Search Report (PCT/ISA/210) issued on Aug. 9, 2011, by the Japanese Patent Office as the International Searching Authority for International Application No. PCT/JP2011/062906.
Written Opinion (PCT/ISA/237) issued on Aug. 9, 2011, by the Japanese Patent Office as the International Searching Authority for International Application No. PCT/JP2011/062906.

\* cited by examiner

IMPELLER AND METHOD FOR PRODUCING SAME

TECHNICAL FIELD

The present invention relates to an impeller that integrally includes a substrate and multiple impeller blades that are provided upright along a curved shape and spaced apart in a circumferential direction on one face of the substrate, the impeller blades each being configured by an inner circumferential-side blade portion arranged so as to be located on an inner circumferential side of the substrate and oriented so as to extend in a direction along a rotary shaft core and have a tip side that is bent, and an outer circumferential-side blade portion arranged so as to be located on an outer circumferential side of the substrate and oriented so as to extend in the direction along the rotary shaft core, and relates to a method for producing the same.

BACKGROUND ART

With the above-described impeller, the inner circumferential-side blade portion of the impeller blade is arranged so as to be located on the inner circumferential side of the substrate and oriented so as to extend in the direction along the rotary shaft core and have a tip side that is bent, thus enabling a fluid to be efficiently drawn from the inner circumferential side of the substrate by the inner circumferential-side blade portion.

When the above-described conventional impeller is produced, the impeller blade is divided into the inner circumferential-side blade portion and the outer circumferential-side blade portion, which are created separately, and then the inner circumferential-side blade portion and the outer circumferential-side blade portion are assembled so as to be integrated.

The inner circumferential-side blade portion is provided so as to be integrated with the substrate of an inducer that is attached to the inlet side of the impeller, for example (e.g., see Patent Document 1).

PRIOR ART DOCUMENTS

Patent Document

Patent Document 1: JP 2666490B

SUMMARY OF INVENTION

Problem to be Solved by the Invention

For this reason, the inner circumferential-side blade portion and the outer circumferential-side blade portion of the impeller blade need to be assembled so as to be integrated when producing the impeller, and there is the risk of an increase in the effort required for assembly.

Also, since the impeller blade is provided upright on the substrate along a curved shape, the inner circumferential-side blade portion, which is oriented so as to extend in the direction along the rotary shaft core and have a tip side that is bent, has a three-dimensional shape.

For this reason, in the case where an impeller that integrally includes a substrate and multiple impeller blades is produced by being formed using a die, there is the risk that the task of separating the molded piece from the die will be laborious, and that the production process for the impeller will become complicated.

Also, in the case where an impeller integrally including a substrate and multiple impeller blades is produced using cutting work, three-dimensional work needs to be performed, and there is the risk that the production process for the impeller will become complicated in this case as well.

The present invention was achieved in light of the above-described circumstances, and an object thereof is to provide an impeller that can integrally include a substrate and impeller blades that are provided with a three-dimensional inner circumferential-side blade portion, and also achieve simplification in production.

Means for Solving Problem

According to a first characteristic configuration of an impeller of the present invention, the impeller includes a substrate, and a plurality of impeller blades that are provided upright along a curved shape and spaced apart in a circumferential direction on one face of the substrate, wherein the impeller blades extend in the circumferential direction while expanding in diameter from a rotary shaft core side, the impeller blades are each configured by an inner circumferential-side blade portion arranged so as to be located on an inner circumferential side of the substrate and oriented so as to extend in a direction along a rotary shaft core and have a tip side that is bent, and an outer circumferential-side blade portion arranged so as to be located on an outer circumferential side of the substrate and oriented so as to extend in the direction along the rotary shaft core, with respect to the direction along the rotary shaft core, the length of the inner circumferential-side blade portion from the substrate side to the tip side is longer than the length of the outer circumferential-side blade portion from the substrate side to the tip side, and with respect to the direction along the rotary shaft core, a blade thickness of the inner circumferential-side blade portion gradually decreases from the substrate side toward the tip side.

According to the impeller having this configuration, the impeller blades extend in the circumferential direction while expanding in diameter from the rotary shaft core side, and with respect to the direction along the rotary shaft core, the length of the inner circumferential-side blade portion from the substrate side to the tip side is longer than the length of the outer circumferential-side blade portion from the substrate side to the tip side, and the blade thickness of the inner circumferential-side blade portion gradually decreases from the substrate side toward the tip side.

For this reason, in the production of the impeller, if the inner circumferential-side blade portion, whose length from the substrate side to the tip side in the direction along the rotary shaft core is longer than the length of the outer circumferential-side blade portion from the substrate side to the tip side, and whose blade thickness gradually decreases from the substrate side toward the tip side, is integrally provided on the substrate so as to have a two-dimensional shape projecting in the direction along the rotary shaft core, the impeller can be easily produced with a task of plastically deforming the inner circumferential-side blade portion into a three-dimensional shape by separately bending the tip side portion of the inner circumferential-side blade portion, which has a long length from the substrate side to the tip side and is easily bendable due to having a low blade thickness.

Accordingly, with the impeller having this configuration, it is possible to integrally include a substrate and impeller blades that are provided with a three-dimensional inner circumferential-side blade portion, and also achieve simplification in production.

According to a second characteristic configuration of an impeller of the present invention, the impeller includes a substrate, and a plurality of impeller blades that are provided upright along a curved shape and spaced apart in a circumferential direction on one face of the substrate, wherein the impeller blades are each provided upright such that an inner circumferential-side blade portion and an outer circumferential-side blade portion are continuous with each other, the inner circumferential-side blade portion being arranged so as to be located on an inner circumferential side of the substrate and oriented so as to extend in a direction along a rotary shaft core and have a tip side that is bent, and the outer circumferential-side blade portion being arranged so as to be located on an outer circumferential side of the substrate and oriented so as to extend in the direction along the rotary shaft core, with respect to the direction along the rotary shaft core, the length of the inner circumferential-side blade portion from the substrate side to the tip side is longer than the length of the outer circumferential-side blade portion from the substrate side to the tip side, and with respect to the direction along the rotary shaft core, a blade thickness of the inner circumferential-side blade portion gradually decreases from the substrate side toward the tip side.

According to the impeller having this configuration, the impeller blades are provided upright such that the inner circumferential-side blade portion and the outer circumferential-side blade portion are continuous with each other, and with respect to the direction along the rotary shaft core, the length of the inner circumferential-side blade portion from the substrate side to the tip side is longer than the length of the outer circumferential-side blade portion from the substrate side to the tip side, and the blade thickness of the inner circumferential-side blade portion gradually decreases from the substrate side toward the tip side.

For this reason, in the production of the impeller, if the inner circumferential-side blade portion, whose length from the substrate side to the tip side in the direction along the rotary shaft core is longer than the length of the outer circumferential-side blade portion from the substrate side to the tip side, and whose blade thickness gradually decreases from the substrate side toward the tip side, is integrally provided on the substrate so as to have a two-dimensional shape projecting in the direction along the rotary shaft core, the impeller can be easily produced with a task of plastically deforming the inner circumferential-side blade portion into a three-dimensional shape by separately bending the tip side portion of the inner circumferential-side blade portion, which has a long length from the substrate side to the tip side and is easily bendable due to having a low blade thickness.

Accordingly, with the impeller having this configuration, it is possible to integrally include a substrate and impeller blades that are provided with a three-dimensional inner circumferential-side blade portion, and also achieve simplification in production.

According to a third characteristic configuration of the present invention, a discontinuous portion at which a rate of gradual decrease in the blade thickness changes discontinuously may be provided along the curved shape of the inner circumferential-side blade portion, and the inner circumferential-side blade portion may be provided upright and oriented so as to be bent toward at least one of the outer circumferential side of the substrate and the inner circumferential side of the substrate along the discontinuous portion.

According to this configuration, when the inner circumferential-side blade portion that is two-dimensional and integrally provided on the substrate is plastically deformed into an orientation in which the tip side portion is bent toward at least one of the outer circumferential side of the substrate and the inner circumferential side of the substrate, the portion on the tip side of the discontinuous portion provided along the curved shape of the inner circumferential-side blade portion can be easily bent by focusing the bending force at the discontinuous portion.

Accordingly, the inner circumferential-side blade portion can be easily plastically deformed into an orientation in which the tip side portion is bent toward at least one of the outer circumferential side of the substrate and the inner circumferential side of the substrate.

According to a fourth characteristic configuration of the present invention, the substrate may configure an impeller back plate, and a shroud that is to be assembled opposing the impeller back plate with the plurality of impeller blades sandwiched therebetween may be fixed to the outer circumferential-side blade portions of the impeller blades.

According to this configuration, the shroud is fixed to the outer circumferential-side blade portions of the impeller blades, that is to say, to the two-dimensional inner circumferential-side blade portions oriented so as to project in the direction along the rotary shaft core, and therefore the shroud can be easily and precisely fixed to the impeller blades.

According to a fifth characteristic configuration of the present invention, a drainage hole may be formed in the substrate.

Coolant is discharged from the inner circumferential-side blade portions in the axis direction when the impeller rotates, and according to this configuration, coolant that remains at the inner circumferential-side blade portions instead of being discharged can be efficiently drained through the drainage hole. Draining coolant through the drainage hole enables reducing the torque required to rotate the impeller.

According to a sixth characteristic configuration of the present invention, fitting recessed portions in which the outer circumferential-side blade portions are fitted may be formed in the shroud.

According to this configuration, when the shroud is fixed to the impeller blades, it is possible to fit projection portions of the outer circumferential-side blade portions of the impeller blades with the fitting recessed portions of the shroud. Accordingly, the impeller blades and the shroud can be firmly fixed, thus enabling suppressing the generation or noise, vibration, and the like that accompany the rotation of the impeller blades.

According to a characteristic configuration of a method for producing an impeller of the present invention, the method includes as separate steps: a molding step of using a molding die, which can be mold-clamped in a direction along a rotary shaft core of the impeller, to mold an impeller intermediate product that integrally includes a substrate and a plurality of impeller blades that are provided upright along a curved shape and spaced apart in a circumferential direction on one face of the substrate, the impeller blades each including an inner circumferential-side blade portion and an outer circumferential-side blade portion that are continuous with each other, the inner circumferential-side blade portion being arranged so as to be located on an inner circumferential side of the substrate and oriented so as to extend in the direction along the rotary shaft core, and the outer circumferential-side blade portion being arranged so as to be located on an outer circumferential side of the substrate and oriented so as to extend in the direction along the rotary shaft core; and a plastic deformation step of plastically deforming the inner circumferential-side blade portion of the impeller intermediate product so as to bend toward at least one of the outer circumferential side of the substrate and the inner circumferential side of the substrate.

According to the method for producing an impeller having this configuration, in the molding step of molding the impeller intermediate product that integrally includes the substrate and the impeller blades, instead of molding an inner circumferential-side blade portion oriented so as to be bent toward at least one of the outer circumferential side of the substrate and the inner circumferential side of the substrate, a two-dimensional inner circumferential-side blade portion oriented so as to extend in the direction along the rotary shaft core is integrally molded with the substrate.

For this reason, the impeller intermediate product can be easily separated from the molding die.

Then, in the plastic deformation step that is separate from the molding step, the two-dimensional inner circumferential-side blade portion of the impeller intermediate product, which is oriented so as to extend in the direction along the rotary shaft core, is plastically deformed into a three-dimensional shape in an orientation of being bent toward at least one of the outer circumferential side of the substrate and the inner circumferential side of the substrate.

Accordingly, in the production of an impeller that integrally includes a substrate and impeller blades that are provided with a three-dimensional inner circumferential-side blade portion, an impeller intermediate product can be easily separated from a molding die in a molding step, thus making it possible to achieve simplification in the production of the impeller.

BRIEF DESCRIPTION OF THE DRAWINGS

FIG. 1 is a side view of a rotor unit that includes an impeller according to the present invention.

FIG. 2 is a vertical cross-sectional view of the rotor unit.

FIG. 3 is a plan view of the impeller.

[FIG. 4]

FIG. 5 is a perspective view of an impeller blade.

FIG. 6 is a perspective view of a shroud.

FIG. 7 is a cross-sectional view of a die device taken in a direction along a rotary shaft core of the impeller.

FIG. 8 is a perspective view of an impeller intermediate product.

[FIG. 9]

DESCRIPTION OF EMBODIMENTS

Hereinafter, an embodiment of the present invention will be described with reference to the drawings.

Figure 1:
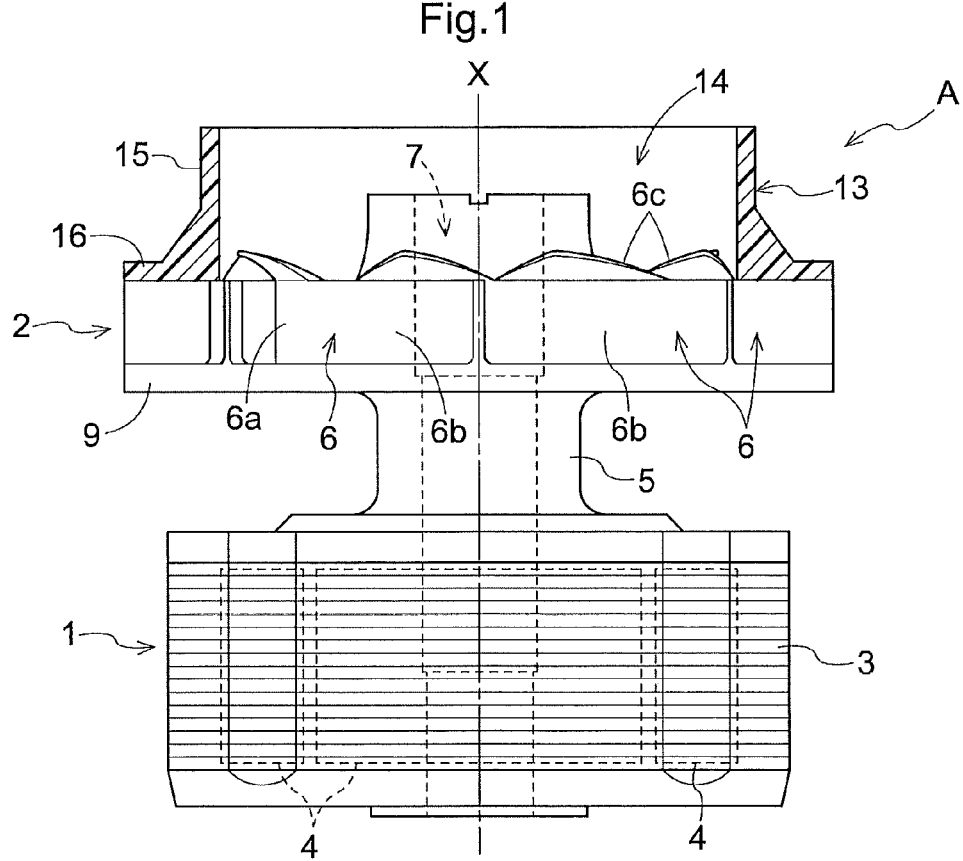
[FIG. 1]
Figure 2:
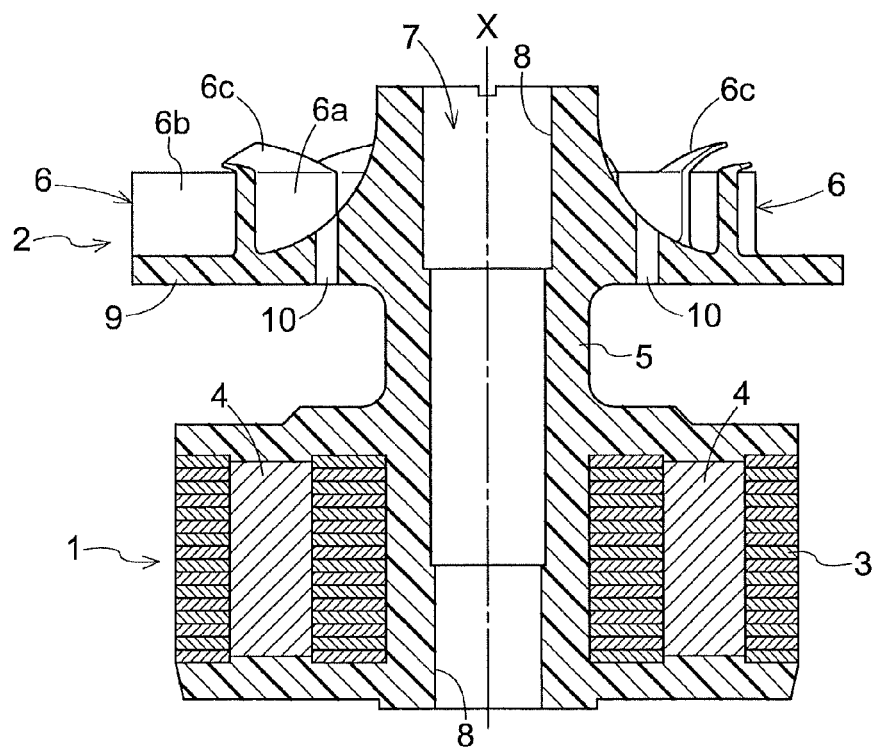
[FIG. 2]

FIGS. 1 and 2 show a rotor unit A of an inner-rotor brushless motor that is used in a water pump for use in a vehicle.

The rotor unit A is an integrated body including a rotor 1 for the brushless motor and an impeller 2 according to the present invention that is for a water pump, is centrifugal, and is made of resin.

The rotor 1 has a yoke 3, which is formed by stacking magnetic metal sheets, and a magnet 4, and the rotor 1 is integrated with the impeller 2 using a resin material, thus forming the rotor unit A.

This resin material can be a thermoplastic resin such as PPS (Polyphenylene Sulfide), which is a fire-retardant resin that is highly heat-resistant and rigid The impeller 2 is provided on one end side of the rotor 1 via a connecting shaft portion 5. The impeller 2 rotates integrally with the rotor 1, and impeller blades 6 act on water in the water pump.

As shown in FIG. 2, a rotary shaft insertion hole 7 that penetrates from the rotor 1 to the impeller 2 via the connecting shaft portion 5 is formed in a central portion of the rotor unit A. A support shaft (not shown) is inserted into the rotary shaft insertion hole 7 from the impeller 2 side. This support shaft is supported by two bearing portions 8 at the front and rear that are formed on the inner wall of the rotary shaft insertion hole 7.

Figure 3:
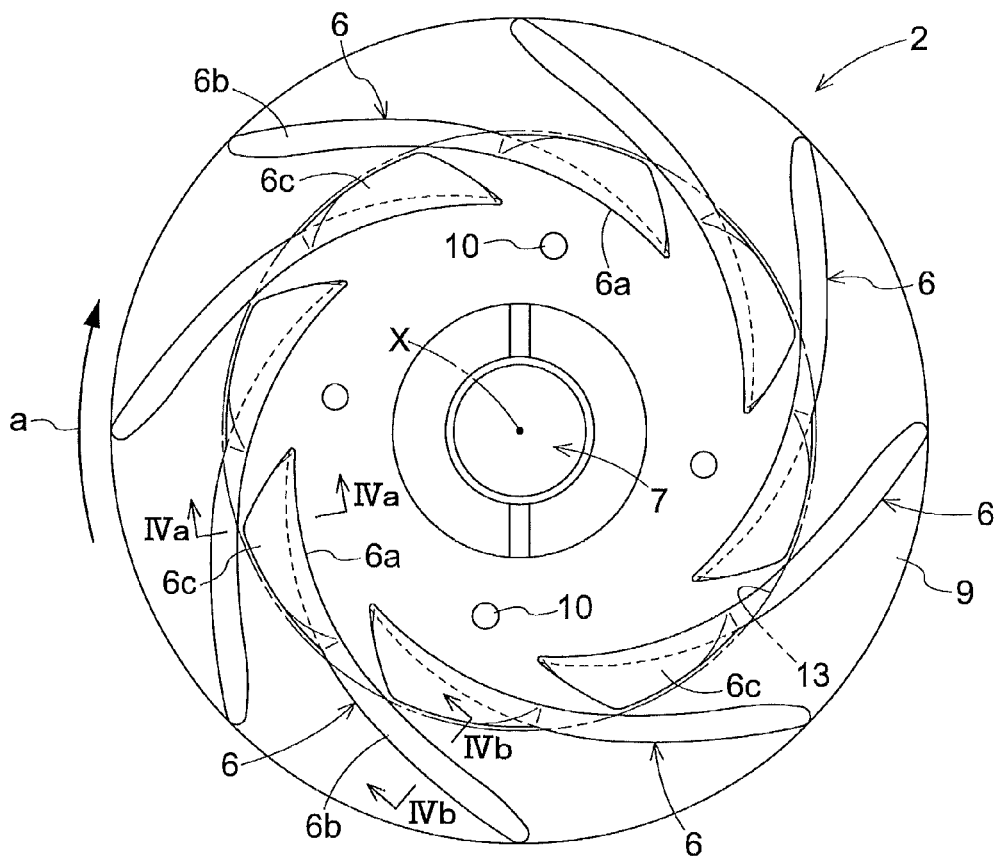
[FIG. 3]

The impeller 2 rotates in the direction indicated by an arrow a in FIG. 3.

As shown in FIG. 3 as well, the impeller 2 integrally includes a resin impeller back plate 9, which is a circular substrate about a rotary shaft core X, and multiple resin impeller blades 6 that are provided upright along a curved shape and are spaced apart at a constant interval in the circumferential direction on one face of the impeller back plate 9 (the face on the side opposite to the rotor 1). The impeller back plate 9 is integrally connected to the rotor 1 via the connecting shaft portion 5.

Drainage holes 10 are formed in the impeller back plate 9. Coolant that remains at the inner circumferential-side blade portion instead of being discharged can be drained through the drainage holes 10.

Each impeller blade 6 extends in the circumferential direction while expanding in diameter from the rotary shaft core X side, and is provided upright such that a three-dimensional inner circumferential-side blade portion 6a and a two-dimensional outer circumferential-side blade portion 6b are continuous with each other.

The inner circumferential-side blade portion 6a is arranged so as to be located on the inner circumferential side of the impeller back plate 9 (referred to hereinafter as the inner circumferential side of the substrate) and oriented so as to extend along a curved shape having a greater curvature than that of the outer circumferential-side blade portion 6b in a direction along the rotary shaft core X, and so as to have a tip side portion 6c that is bent toward the outer circumferential side of the impeller back plate 9 (downstream side in the rotation direction a) along the normal direction of the curved shape.

The outer circumferential-side blade portion 6b is arranged so as to be located on the outer circumferential side of the impeller back plate 9 (referred to hereinafter as the outer circumferential side of the substrate) and oriented so as to extend in a direction along the rotary shaft core X.

For each impeller blade 6, with respect to the direction along the rotary shaft core X, a length (referred to hereinafter as the blade width) B of the inner circumferential-side blade portion 6a shown in FIG. 4(a) from the substrate 9 side to the tip side is set longer than a length (blade width) B of the outer circumferential-side blade portion 6b shown in FIG. 4(b) from the substrate 9 side to the tip side.

Figure 4A:
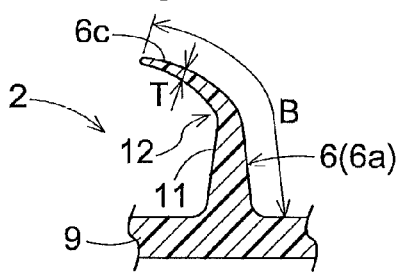
FIG. 4(a) is a cross-sectional arrow view of an inner circumferential-side blade portion taken along line IVa-IVa in FIG. 3.
Figure 4B:
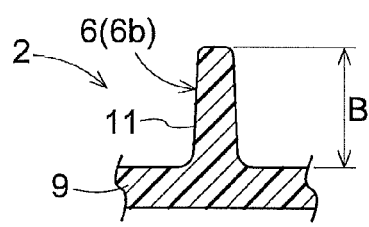
FIG. 4(b) is a cross-sectional arrow view of an outer circumferential-side blade portion taken along line IVb-IVb in FIG. 3.

Also, as shown in FIG. 4(a), a blade thickness T of the inner circumferential-side blade portion 6a is set so as to gradually decrease from the impeller back plate 9 side toward the tip side in the direction along the rotary shaft core X.

In other words, when the tip side portion 6c of the inner circumferential-side blade portion 6a is bent toward the downstream side in the rotation direction a, the tip side portion 6c can be easily bent into a curved shape that is bent in a continuous manner, and thus water in the water pump can be efficiently scooped in.

Figure 5:
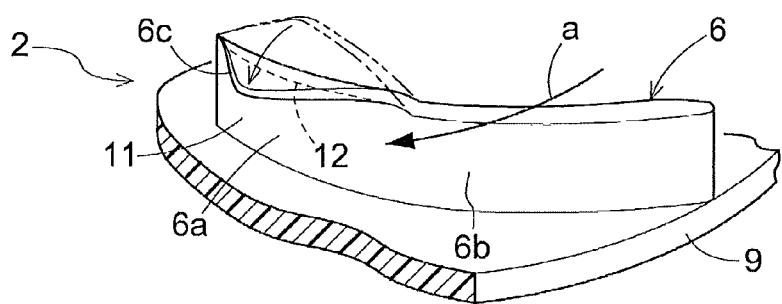
[FIG. 5]

A discontinuous portion 12 at which the rate of gradual decrease in the blade thickness T changes discontinuously is provided in the shape of a strip along the curved shape of the inner circumferential-side blade portion 6a (lengthwise direction of the inner circumferential-side blade portion 6a) at an intermediate position in the direction along the blade width B on a blade face 11 that faces the outer circumferential side of the substrate of the inner circumferential-side blade portion 6a (downstream side in the rotation direction a), and as shown in FIG. 5, the tip side portion 6c of the inner circumferential-side blade portion 6a is provided upright and oriented so as to curve toward the outer circumferential side of the substrate along the discontinuous portion 12.

A resin shroud 13 formed in the shape of a circular ring is assembled with the outer circumferential-side blade portions 6b of the impeller blades 6 so as to oppose the impeller back plate 9 with the impeller blades 6 sandwiched therebetween.

Figure 6:
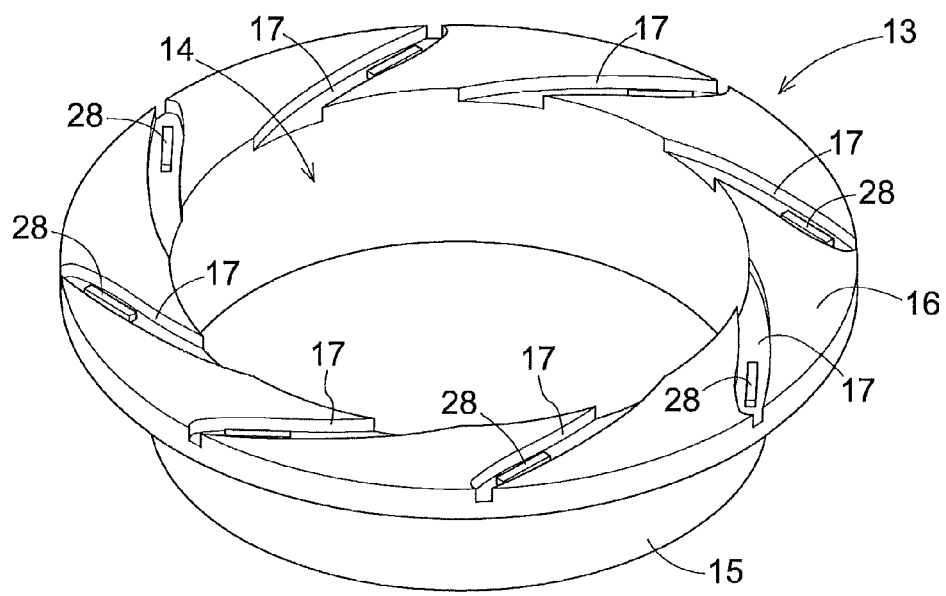
[FIG. 6]

As shown in FIG. 6, the shroud 13 includes a cylindrical portion 15 that forms an inlet 14, and a circular flange portion 16 to which the outer circumferential-side blade portions 6b are fixedly joined, the cylindrical portion 15 and the circular flange portion 16 being concentric with each other.

Fitting recessed portions 17, into which the outer circumferential-side blade portions 6b are fixedly fit, are formed spaced apart at a constant interval in the circumferential direction on an end face of the circular flange portion 16.

The tip sides of the outer circumferential-side blade portions 6b of the impeller blades 6 are fit into the fitting recessed portions 17 so as to be fixedly joined to them, and the inner circumferential-side blade portions 6a approach the inlet 14 from the inner side of the shroud 13.

The following describes a method for producing the impeller 2 of the present invention, which is integrated with the rotor 1.

Figure 7:
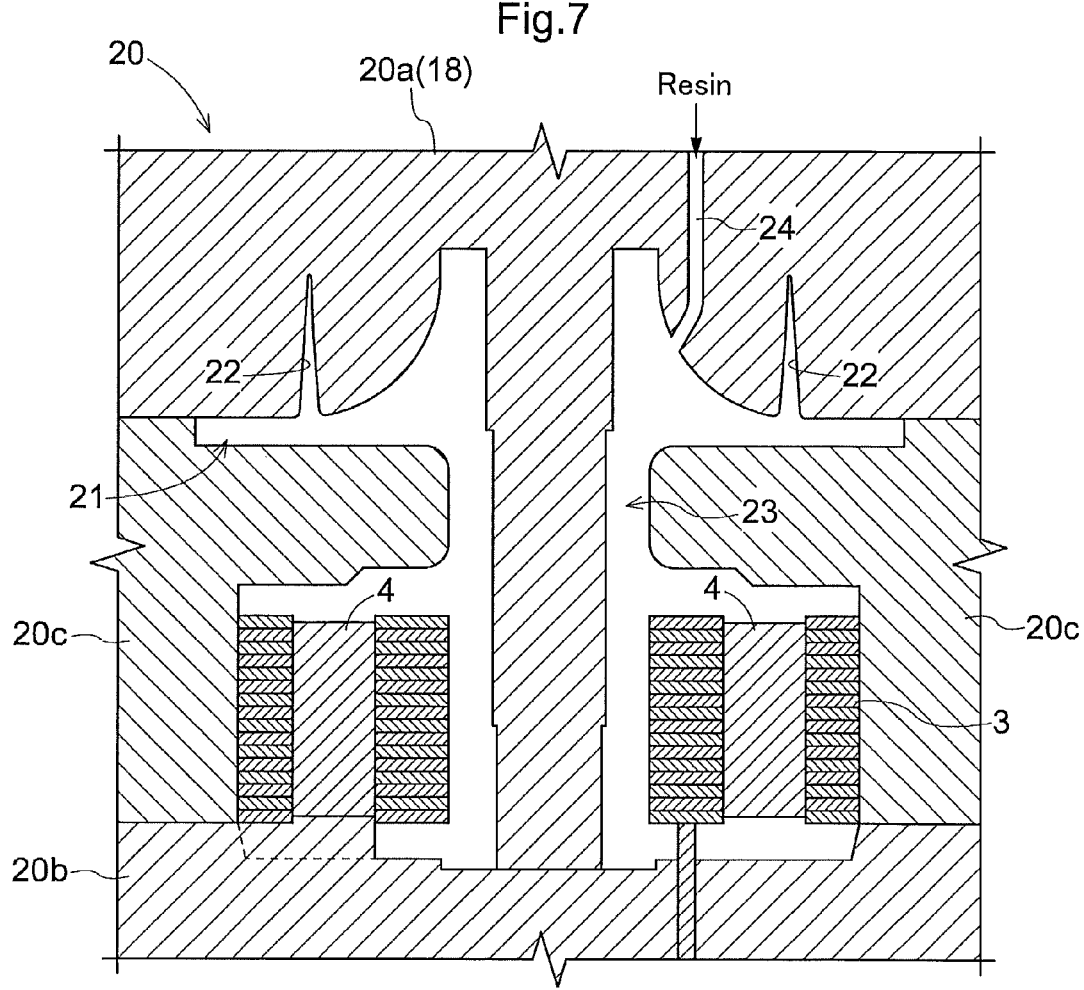
[FIG. 7]
Figure 8:
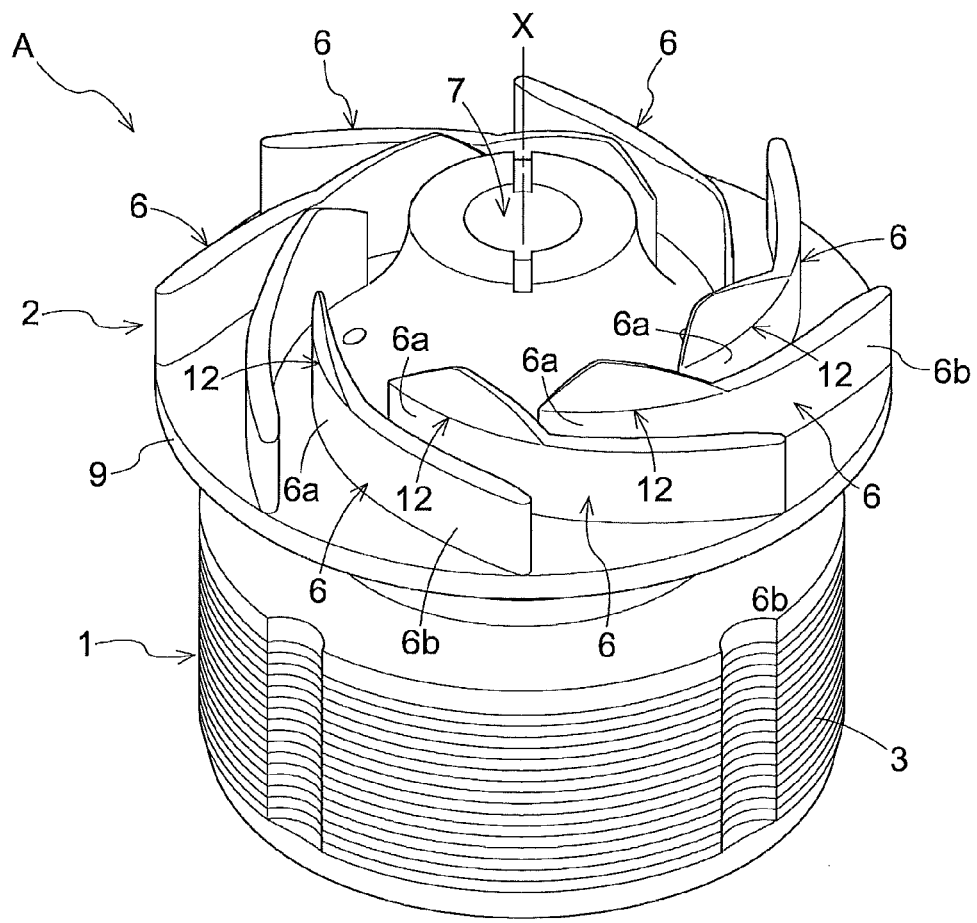
[FIG. 8]
Figure 9A:
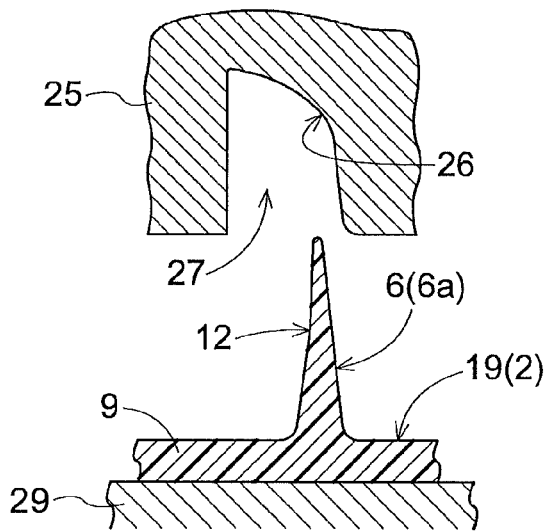
FIGS. 9(a) and 9(b) are cross-sectional views showing a plastic deformation step.
Figure 9B:
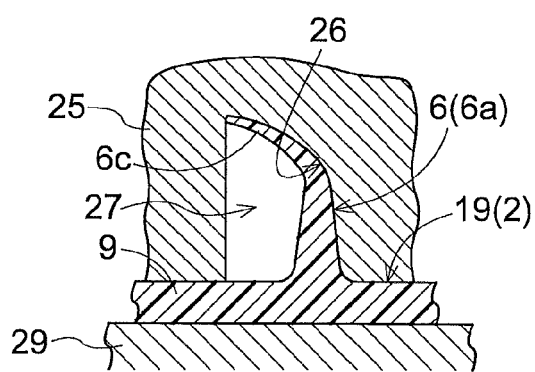

The method for producing an impeller includes the following separate steps: a molding step of using a molding die 18, which can be mold-clamped in a direction along the rotary shaft core X of the impeller 2 as shown in FIG. 7, to resin-mold an impeller intermediate product 19 that, as shown in FIG. 8, integrally includes an impeller back plate 9 and multiple impeller blades 6, the impeller blades 6 each including an inner circumferential-side blade portion 6a and an outer circumferential-side blade portion 6b that are continuous with each other, the inner circumferential-side blade portion 6a being arranged so as to be located on the inner circumferential side of the substrate and oriented so as to extend in the direction along the rotary shaft core X over the entire length along the blade width B, and the outer circumferential-side blade portion 6b being arranged so as to be located on the outer circumferential side of the substrate and oriented so as to extend in the direction along the rotary shaft core X over the entire length along the blade width B; a plastic deformation step of, as shown in FIG. 9, plastically deforming a tip side portion 6c of the inner circumferential-side blade portion 6a of the impeller intermediate product 19 so as to bend toward the outer circumferential side of the substrate; and an assembly step of assembling a shroud 13 with the impeller blades 6.

FIG. 7 shows a die device 20 that is used for resin-molding the rotor unit A that integrally includes the impeller 2 and the rotor 1, in the molding step.

The die device 20 includes four molding dies, namely an upper die 20a, a lower die 20b, and a pair of left and right intermediate dies 20c between the upper die 20a and the lower die 20b.

The upper die 20a is provided so as to be able to be mold-clamped to the left and right intermediate dies 20c in the direction along the rotary shaft core X of the impeller 2, an impeller back plate formation cavity 21 is provided between the upper die 20a and the left and right intermediate dies 20c, and the upper die 20a is provided with impeller blade formation cavities 22 that respectively correspond to the impeller blades 6.

Accordingly, the upper die 20a corresponds to the molding die 18 that can be mold-clamped in the direction along the rotary shaft core X of the impeller 2.

The yoke 3 and the magnet 4 are mounted in a cavity 23 formed between the upper die 20a, the lower die 20b, and the left and right intermediate dies 20c, and a resin material is injected through a gate 24 provided in the upper die 20a, thus integrally forming the rotor unit A.

The impeller blade formation cavities 22 are provided so as to form two-dimensional impeller blades 6 oriented such that the inner circumferential-side blade portion 6a and the outer circumferential-side blade portion 6b extend on the impeller back plate 9 in the direction along the rotary shaft core X (mold-clamping direction).

FIG. 8 shows the impeller intermediate product 19 that has been resin-molded in the molding step, and the impeller blades 6 are integrally formed on the impeller back plate 9 so as to be two-dimensionally shaped and oriented such that the inner circumferential-side blade portion 6a and the outer circumferential-side blade portion 6b project in the direction along the rotary shaft core X on the impeller back plate 9 over the entire length along the blade width B.

The discontinuous portion 12 at which the rate of gradual decrease in the blade thickness T changes discontinuously is formed in the shape of a strip along the curved shape of the inner circumferential-side blade portion 6a (the lengthwise direction of the inner circumferential-side blade portion 6a) on the side face of the inner circumferential-side blade portion 6a of the impeller intermediate product 19 that faces the rotation direction a.

FIGS. 9 show the plastic deformation step in which the inner circumferential-side blade portion 6a of the impeller intermediate product 19, which is placed on a base 29, is bent by being pressed by a pressing die 25 under heat such that the tip side portion 6c is plastically deformed into a three-dimensional shape in an orientation of being bent toward the outer circumferential side of the substrate along the discontinuous portion 12.

Recessed portions 27 are formed in the pressing die 25, each including a pressing face 26 for deforming the tip side portion 6c of the inner circumferential-side blade portion 6a into a predetermined shape facing the downstream side in the rotation direction.

Accordingly, the inner circumferential-side blade portion 6a of the two-dimensional impeller blade 6 that projects in the direction along the rotary shaft core X can be introduced into the recessed portion 27 so as to cause the tip side portion 6c of the inner circumferential-side blade portion 6a to be plastically deformed into a predetermined shape of being bent toward the outer circumferential side of the substrate along the discontinuous portion 12.

In this plastic deformation step, at least the temperature of the inner circumferential-side blade portion 6a is kept in the material deformation temperature range (210 to 220° C. in the present embodiment), and then after plastic deformation into the predetermined shape, the impeller blade 6 is rapidly cooled and hardened so as to be oriented such that the tip side of the inner circumferential-side blade portion 6a is bent toward the downstream side in the rotation direction.

As shown in FIG. 6(c), the shroud 13, which is made of the same thermoplastic resin as the resin forming the impeller 2, includes attachment resin projections 28 that function as attachment members and are integrally formed on the bottom faces of the fitting recessed portions 17 formed in the circular flange portion 16, and this shroud 13 is assembled with the impeller blades 6 in the assembly step.

The impeller blades 6 and the shroud 13 are joined together as shown in FIG. 1 by pressing the tip portions of the outer circumferential-side blade portions 6b into the fitting recessed portions 17 with the resin projections 28 sandwiched therebetween, and then performing ultrasonic fusion for melting the resin projections 28 with ultrasonic vibration and pressure application.

Other Embodiments

1. The impeller of the present invention may integrally include impeller blades and a shroud serving as the substrate.

2. The impeller of the present invention may include impeller blades and a substrate that are integrally formed using a metal material.

3. The impeller of the present invention may be configured such that the inner circumferential-side blade portions of the impeller intermediate product, whose temperature is kept in the material deformation temperature range immediately after being resin-molded, are plastically deformed in the plastic deformation step so as to bend toward the downstream side in the rotation direction.

4. The impeller of the present invention may be configured such that the inner circumferential-side blade portions are provided so as to be upright and oriented such that the tip side is bent toward the inner circumferential side (upstream side in the rotation direction) of the impeller back plate (substrate) along the normal direction of the curved shape.

In this case, in the plastic deformation step of the impeller production method, the inner circumferential-side blade portions of the impeller intermediate product are plastically deformed so as to bend toward the inner circumferential side of the substrate.

DESCRIPTION OF REFERENCE SIGNS

2 Impeller
6 Impeller blade
6a Inner circumferential-side blade portion
6b Outer circumferential-side blade portion
6c Tip side
9 Substrate (impeller back plate)
10 Drainage hole
11 Blade face
12 Discontinuous portion
13 Shroud
17 Fitting recessed portion
18 Molding die
19 Impeller intermediate product
B Length of impeller blade from substrate side to tip side
T Blade thickness
X Rotary shaft core

The invention claimed is:

1. An impeller integrally comprising:
a substrate; and a plurality of impeller blades that are provided upright along a curved shape and spaced apart in a circumferential direction on one face of the substrate,
wherein the impeller blades extend in the circumferential direction while expanding in diameter from a rotary shaft core side,
the impeller blades are each configured by an inner circumferential-side blade portion arranged so as to be located on an inner circumferential side of the substrate and oriented so as to extend in a direction along a rotary shaft core and have a tip side that is bent, and an outer circumferential-side blade portion arranged so as to be located on an outer circumferential side of the substrate and oriented so as to extend in the direction along the rotary shaft core,
with respect to the direction along the rotary shaft core, the length of the inner circumferential-side blade portion from the substrate side to the tip side is longer than the length of the outer circumferential-side blade portion from the substrate side to the tip side,
with respect to the direction along the rotary shaft core, a blade thickness of the inner circumferential-side blade portion gradually decreases from the substrate side toward the tip side,
a discontinuous portion at which a rate of gradual decrease in the blade thickness changes discontinuously is provided along the curved shape of the inner circumferential-side blade portion, and
the inner circumferential-side blade portion is provided upright and oriented so as to be bent toward either the outer circumferential side of the substrate or the inner circumferential side of the substrate along the discontinuous portion.

2. The impeller according to claim 1,
wherein the substrate configures an impeller back plate, and
a shroud that is to be assembled opposing the impeller back plate with the plurality of impeller blades sandwiched therebetween is fixed to the outer circumferential-side blade portions of the impeller blades.

3. The impeller according to claim 2, wherein fitting recessed portions in which the outer circumferential-side blade portions are fitted are formed in the shroud.

4. The impeller according to 1, wherein a drainage hole is formed in the substrate.

5. An impeller integrally comprising:
a substrate; and a plurality of impeller blades that are provided upright along a curved shape and spaced apart in a circumferential direction on one face of the substrate,
wherein the impeller blades are each provided upright such that an inner circumferential-side blade portion and an outer circumferential-side blade portion are continuous with each other, the inner circumferential-side blade portion being arranged so as to be located on an inner circumferential side of the substrate and oriented so as to extend in a direction along a rotary shaft core and have a tip side that is bent, and the outer circumferential-side blade portion being arranged so as to be located on an outer circumferential side of the substrate and oriented so as to extend in the direction along the rotary shaft core,
with respect to the direction along the rotary shaft core, the length of the inner circumferential-side blade portion from the substrate side to the tip side is longer than the length of the outer circumferential-side blade portion from the substrate side to the tip side,
with respect to the direction along the rotary shaft core, a blade thickness of the inner circumferential-side blade portion gradually decreases from the substrate side toward the tip side,
a discontinuous portion at which a rate of gradual decrease in the blade thickness changes discontinuously is provided along the curved shape of the inner circumferential-side blade portion, and
the inner circumferential-side blade portion is provided upright and oriented so as to be bent toward either the outer circumferential side of the substrate or the inner circumferential side of the substrate along the discontinuous portion.

* * * * *